Oct. 6, 1931.  A. G. SHERMAN  1,826,328
THERMOSTATIC CONTROL FOR OVENS
Filed Oct. 27, 1930
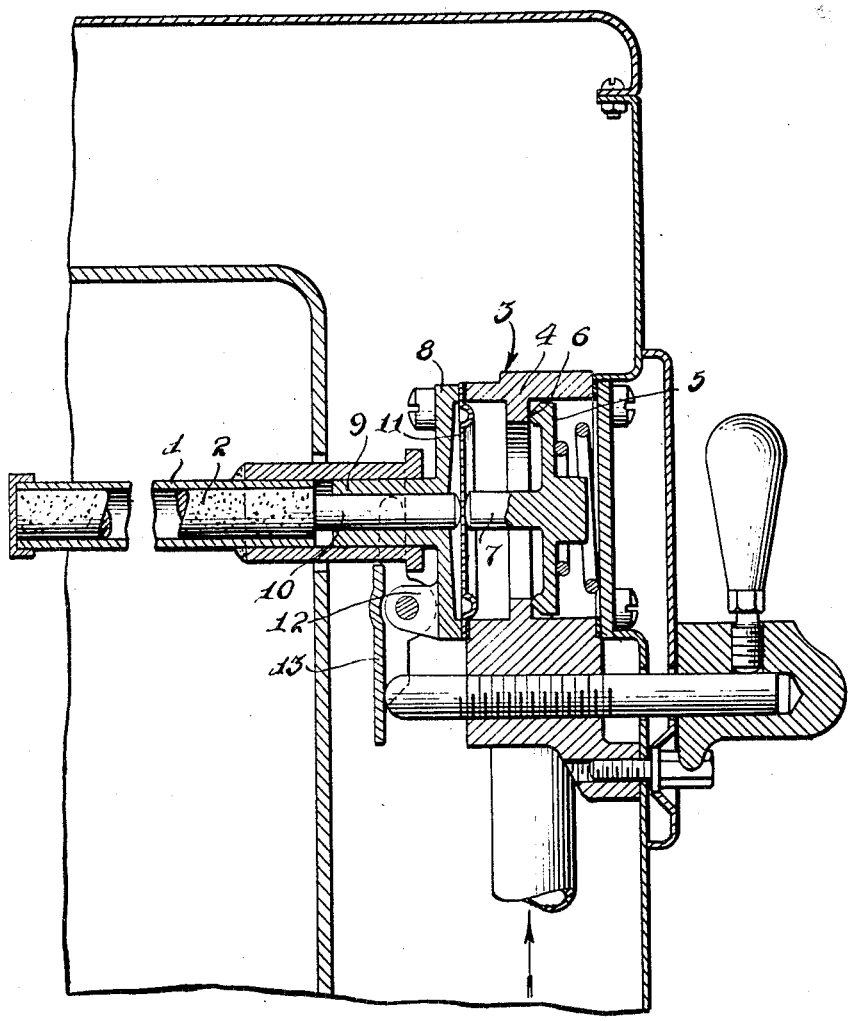
INVENTOR
*ALVIN G. SHERMAN.*
BY
*Barnes & Kisselle*
ATTORNEY Patented Oct. 6, 1931

1,826,328

UNITED STATES PATENT OFFICE

ALVIN G. SHERMAN, OF GROSSE POINTE, MICHIGAN, ASSIGNOR TO THE DETROIT VAPOR STOVE COMPANY, OF DETROIT, MICHIGAN, A CORPORATION OF MICHIGAN

THERMOSTATIC CONTROL FOR OVENS

Application filed October 27, 1930. Serial No. 491,360.

This invention relates to thermostatic control for ovens, and, more particularly, to a self-aligning valve assembly and connection between the valve and heat responsive elements.

Heretofore in the fabrication of thermostatic valve assemblies for controlling the flow of gas, it has been common practice to provide a valve housing having connection with the two gas conduits, a suitable valve therefor, and a connection between the valve and the heat responsive elements to control the operation of the valve. In the fabrication and commercial use of such valve assemblies two major difficulties have presented themselves in the proper seating of the valve upon the valve seat and the prevention of leakage between the valve housing and the interior of the oven.

In my prior application Serial No. 120,042 filed July 2, 1926 I have disclosed a valve which is completely freely floating relative to the valve stem which permits accurate seating on the valve regardless of the exact axis of the valve stem. However, it was necessary to have a fairly tight fit between valve stem and housing to prevent the leakage of gas.

Many different forms of valve stems or connections between the valve stem and heat responsive elements have been designed in attempts to prevent leakage of gas. It is the object of the present invention to provide valve actuating means so designed relative to the housing structure as to completely eliminate any possibility of gas leakage and at the same time insure positive seating of the valve irrespective of the position or alignment of the valve stem and connecting means. Other features reside in details of construction and particularly in the compact and simple arrangement of parts.

The drawing is a vertical sectional view taken through my novel valve assembly as installed in a standard oven.

The heat responsive elements may be generally designated 1 and 2 and these are carried by means of a valve housing which may be generally designated 3. The valve housing is provided with a valve seat 4 for dividing the inlet and outlet chambers as is the usual practice.

A spring pressed valve 5 is positioned in one side of the housing 3 and provided with an annular contact surface 6 for contacting with the seat 4. This valve is also provided with an integrally extending valve stem 7.

A housing cover 8 forms a bearing 9 for slidably supporting the heat responsive elements 1 and 2 and for guiding a connecting pin 10, and also has an integral extension 12 for supporting the actuating lever 13.

The pin 10 has a loose fit within the bearing 9 so that any movement of the heat responsive devices 1 and 2 will be directly transmitted towards the valve without unnecessary friction. A diaphragm member 11 positioned between the cover 8 and the housing 3 serves as the connecting medium between the guide 10 and the valve stem 7 and effectively seals the housing 3 against gas leakage within the oven.

The valve 5 is thus a freely floating valve and because of the rounded ends formed on the valve stem 7 it will be obvious that the valve will always properly seat irrespective of the particular axis of the valve seat or the axis of the guide bearing 9. In other words, the machining of the valve seat 4 need have no particular reference to the machining operation performed on the valve 5 nor the machining operation performed on the guide bearing 9, with the result that the fabrication cost is reduced to a minimum. The entire valve unit is very easy to make as it may be simply a casing with the edges machined, as the rounded end on the stem 7 may or may not be machined. The fit between the pin 10 and the guide 9 may be very loose and it therefore will be obvious that it will be unnecessary to carefully fit and machine the pin 10 as has been the case in the past. It will be seen, therefore, that all the elements of my novel valve assembly may be initially and individually fabricated without the necessity of any accurate machining whatsoever and may be directly assembled irrespective to the relative axial positioning or nature of the respective machined parts.

What I claim is:

1. A self-aligning thermostatic valve assembly, comprising in combination, a valve casing having a valve seat, a cap for said casing including an integrally formed extension for supporting heat responsive elements, said extension also forming the bearing for a connecting pin which fits loosely within said bearing, a diaphragm positioned in place upon the casing by said cap, and a freely floating valve having a single machined annular edge for contacting with said valve seat and having a valve stem extension adapted to contact with one side of said diaphragm.

2. A self-aligning thermostatic valve assembly, comprising in combination a valve casing divided approximately centrally thereof by an integrally formed valve seat, inlet and outlet gas conduits on opposite sides of said valve seat, a freely floating valve having an annular edge adapted to normally contact with the valve seat, said valve having a stem extending through the valve seat to a point adjacent the edge of the valve casing, a diaphragm cover sealing said casing and adapted to contact with said valve stem, a cap for said casing adapted to hold said diaphragm in place, said cap having a bearing extension serving to support heat responsive elements and also serving as a bearing guide for a connecting pin positioned between said heat responsive elements and said diaphragm, said connecting pin being freely mounted within said bearing guide.

3. A self-aligning thermostatic valve assembly, comprising in combination a valve casing divided approximately centrally thereof by an integrally formed valve seat, inlet and outlet gas conduits on opposite sides of said valve seat, a freely floating valve having an annular edge adapted to normally contact with the valve seat, said valve having a stem extending through the valve seat to a point adjacent the edge of the valve casing, a diaphragm cover sealing said casing and adapted to contact with said valve stem, a cap for said casing adapted to hold said diaphragm in place, said cap having a bearing extension serving to support heat responsive elements and also serving as a bearing guide for a connecting pin positioned between said heat responsive elements and said diaphragm, said connecting pin being freely mounted within said bearing guide, and manually actuated means for axially reciprocating said heat responsive elements relative to said support for actuating said valve.

4. A self-aligning thermostatic valve assembly, comprising in combination, a valve casing provided with an integrally formed valve seat, gas conduits leading to opposite sides of said valve seat, a diaphragm covering one side of said valve casing, a freely floating valve within the casing adapted to contact with said valve seat and with said diaphragm, a cap for said casing holding said diaphragm in place and an annular extension formed on said cap for slidably receiving heat responsive elements, and a connecting pin between said heat responsive elements and the diaphragm.

In testimony whereof I affix my signature.

ALVIN G. SHERMAN.